(12) United States Patent
DiMauro

(10) Patent No.: US 6,520,469 B1
(45) Date of Patent: Feb. 18, 2003

(54) SAFETY ATTACHMENT FOR UTILITY POLE TRANSPORT

(76) Inventor: Gerard DiMauro, 40 Bedell St., Staten Island, NY (US) 10309

( * ) Notice: Subject to any disclaimer, the term of this patent is extended or adjusted under 35 U.S.C. 154(b) by 0 days.

(21) Appl. No.: 09/976,910

(22) Filed: Oct. 13, 2001

Related U.S. Application Data

(60) Provisional application No. 60/244,155, filed on Oct. 27, 2000.

(51) Int. Cl.[7] .............................................. B60R 19/02
(52) U.S. Cl. .................... 248/345.1; 293/117; 293/154; 293/102; 248/219.1
(58) Field of Search ........................... 248/229.1, 316.6, 248/345.1, 229.14; 293/117, 102, 154

(56) References Cited

U.S. PATENT DOCUMENTS

| | | | |
|---|---|---|---|
| 2,439,623 A | * 4/1948 | Howells ....................... 224/29 |
| 2,880,016 A | * 3/1959 | Peterson ...................... 280/491 |
| 3,533,654 A | * 10/1970 | Kannegieter ................. 293/73 |
| 3,695,666 A | * 10/1972 | Corson ........................ 293/117 |
| 4,333,674 A | * 6/1982 | Buettner et al. ............. 293/120 |
| 4,528,786 A | * 7/1985 | Dinitz et al. .................... 403/2 |
| D352,019 S | * 11/1994 | Rivero et al. ............... D12/169 |
| 5,507,546 A | * 4/1996 | Holley ........................ 180/276 |
| 5,624,143 A | * 4/1997 | Waldschmitt .............. 280/43.1 |
| 6,203,079 B1 | * 3/2001 | Breed .......................... 188/377 |

* cited by examiner

Primary Examiner—Korie Chan
Assistant Examiner—Ingrid Weinhold
(74) Attorney, Agent, or Firm—Goldstein & Lavas, P.C.

(57) ABSTRACT

A safety attachment for utility pole transport having a mid bracket and an end bracket that attach around a utility pole. The mid bracket is situated along the unsupported length of the pole, and the end bracket is positioned at the rear end of the pole. A plate is attached to the end bracket, covering the end of the utility pole. A horizontal impact beam is situated below the pole, and is attached to the plate with a plurality of vertical members. A pair of diagonal arms extend from the mid bracket to the impact beam and help distribute impact forces on the utility pole. Accordingly, if a vehicle were to collide with the pole, the bumper of the vehicle would strike the impact beam, reducing the severity of damage. Reflectors or lighting devices are positioned along the impact beam to help reduce the chance of a collision.

7 Claims, 3 Drawing Sheets

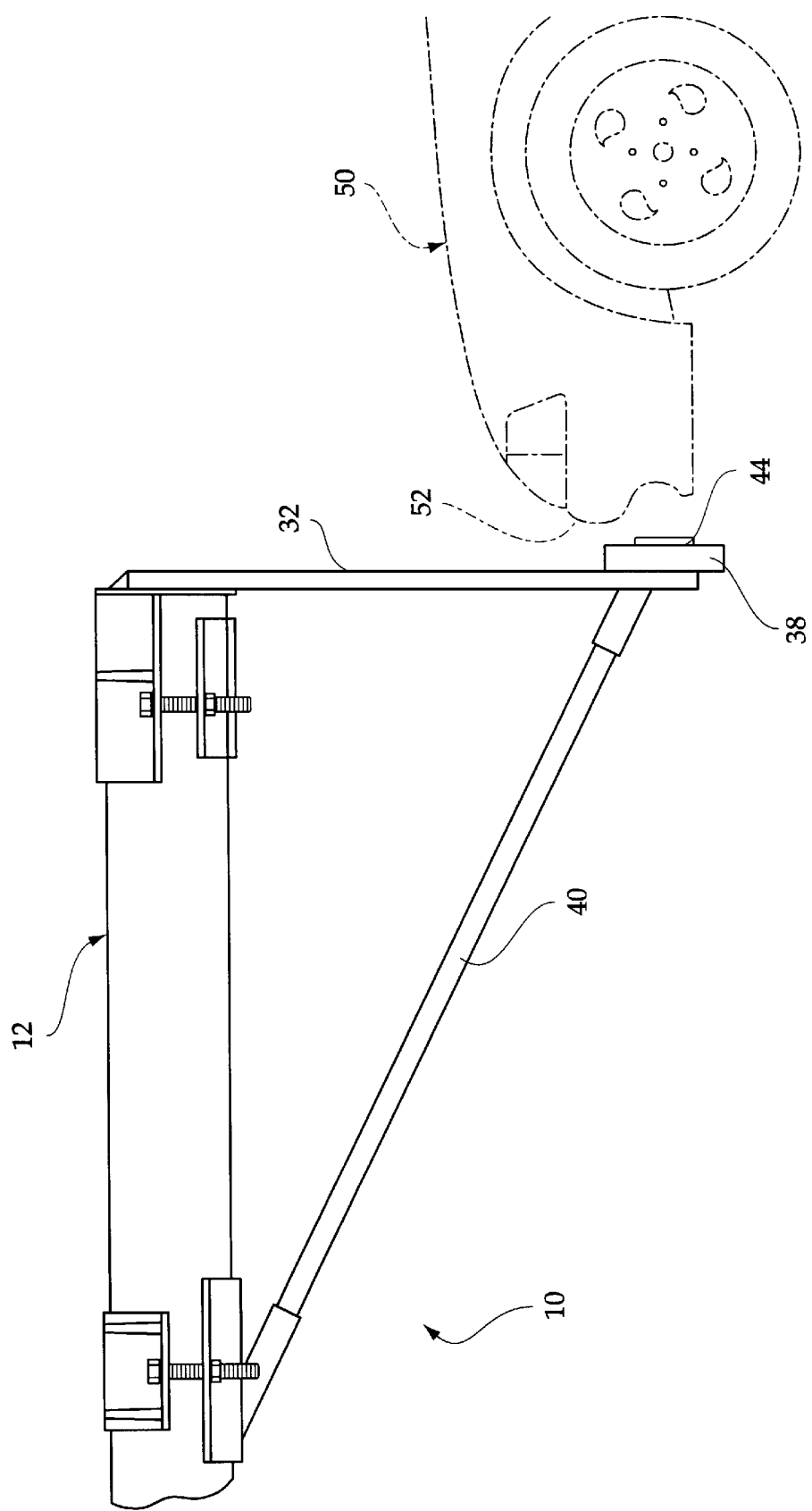

SAFETY ATTACHMENT FOR UTILITY POLE TRANSPORT

CROSS REFERENCES AND RELATED SUBJECT MATTER

This application relates to subject matter contained in provisional patent application Ser. No. 60/244,155, filed in the United States Patent & Trademark Office on Oct. 27, 2000.

BACKGROUND OF THE INVENTION

The invention relates to a safety attachment for utility pole transport. More particularly, the invention relates to a safety attachment which attaches to the proximal end of a utility pole, while it is being transported, to minimize injuries if a vehicle is to collide with the pole.

Public utilities are companies that provide essential services to the public, namely firms that offer electricity, natural gas, telephone, telegraph, water, and sewage services. Electric, telephone and logging companies, in particular, utilize elongated vertical poles that are situated in order to provide services to consumers. These poles are circular wooden structures that are driven vertically into the ground to support wires at elevated heights.

The poles are typically transported to the desired location on a utility wagon that is towed by a truck. Because of the length of said pole, although a large portion of the pole is supported upon the wagon, the remainder is often left to extend unsupported past the rear of the wagon.

While there is little fear that the pole will become dislodged during transport, the potential damage that may be caused to others in the case of an accident is substantial. Because of the positioning of the pole on the wagon, if another vehicle were to collide into the rear of said wagon, the portion of the pole extending outward therefrom could penetrate the windshield of the automobile, injuring or killing the driver and occupants.

Thus, in order to prevent injuries and deaths from occurring in this manner, the safety attachment for utility pole transport provides a casing that attaches to the middle of the pole and reaches to the end of same. This casing provides a flat portion that extends downward from the blunt edge surface of the pole. This construction is designed to minimize harm to a driver of a vehicle in the event of a rear end collision with the utility wagon carrying the pole.

While other units may be suitable for the particular purpose employed, or for general use, they would not be as suitable for the purposes of the present invention as disclosed hereafter.

In this respect, the safety attachment for a utility pole substantially departs.from the conventional concepts and designs of the prior art, and in doing so provides an apparatus primarily developed for the purpose of minimizing injury in the event of an accident.

Therefore, it can be appreciated that there exists a continuing need for a new and improved safety attachment for a utility pole which can be used when transporting said poles on a flatbed truck. In this regard, the present invention substantially fulfills this need.

SUMMARY OF THE INVENTION

It is an object of the invention to produce a safety attachment for utility pole transport that, when secured to a pole, would minimize injury to a driver or occupants of another vehicle in the event of a rear end collision.

To attain this, the present invention essentially comprises a plurality of support members that are connected in a triangular configuration, creating a casing. This casing is secured around a center portion of the pole and extends diagonally to an impact beam immediately below the rear end of said pole. Additional members then extend upward and are attached to the end of the pole. The impact beam joins all members and serves to help distribute impact forces.

There has thus been outlined, rather broadly, the more important features of the invention in order that the detailed description thereof that follows may be better understood, and in order that the present contribution to the art may be better appreciated. There are, of course, additional features of the invention that will be described hereinafter.

In this respect, before explaining at least one embodiment of the invention in detail, it is to be understood that the invention in not limited in its application to the details of construction and to the arrangement of the components set froth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safety attachment for utility pole transport which has all the advantages of the prior art and none of the disadvantages.

It is another object of the present invention to provide a new and improved safety attachment for utility pole transport which may be easily and efficiently manufactured and marketed.

It is a further object of the present invention to provide a new and improved safety attachment for utility pole. transport which is of durable and reliable construction.

An even further object of the present invention is to provide a new and improved safety attachment for utility pole transport which is susceptible of a low cost of manufacture with regard to both materials and labor, and which accordingly is then susceptible of low prices of sale to the target utility companies, thereby making such safety attachment economically available.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 3 is an additional side elevational view of the safety attachment for utility pole transport, secured to a utility pole, wherein an automobile is about to collide with the utility pole, whereby the bumper of the automobile contacts the horizontal impact beam of the safety device.

DETAILED DESCRIPTION OF THE PREFERRED EMBODIMENTS

Figure 1:
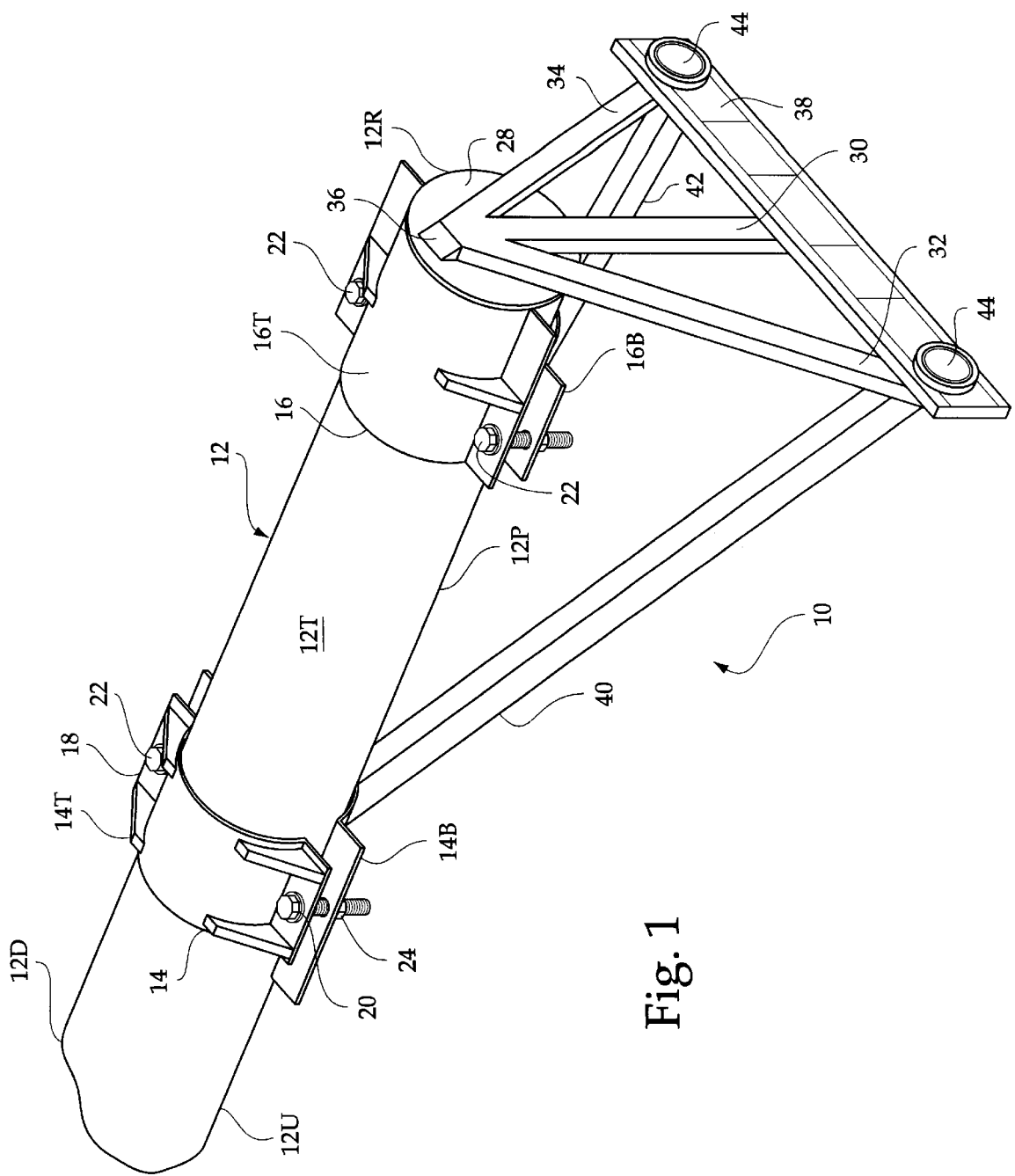
FIG. 1 is a perspective view of the safety attachment for utility pole transport mounted to the proximal end of a utility pole.

FIG. 1 illustrates a safety attachment for utility pole transport 10 secured to a utility pole 12. The utility pole 12 has a proximal portion 12P, a distal portion 12D, an underside 12U, a top surface 12T, and a rear end 12R. The rear end 12R extends outward past the rear edge of a utility wagon and typically is left unsupported. The attachment 10 is secured to the rear end 12R of the pole 12 and is designed to reduce the severity of injuries in the case of an accident with another vehicle.

Figure 2:
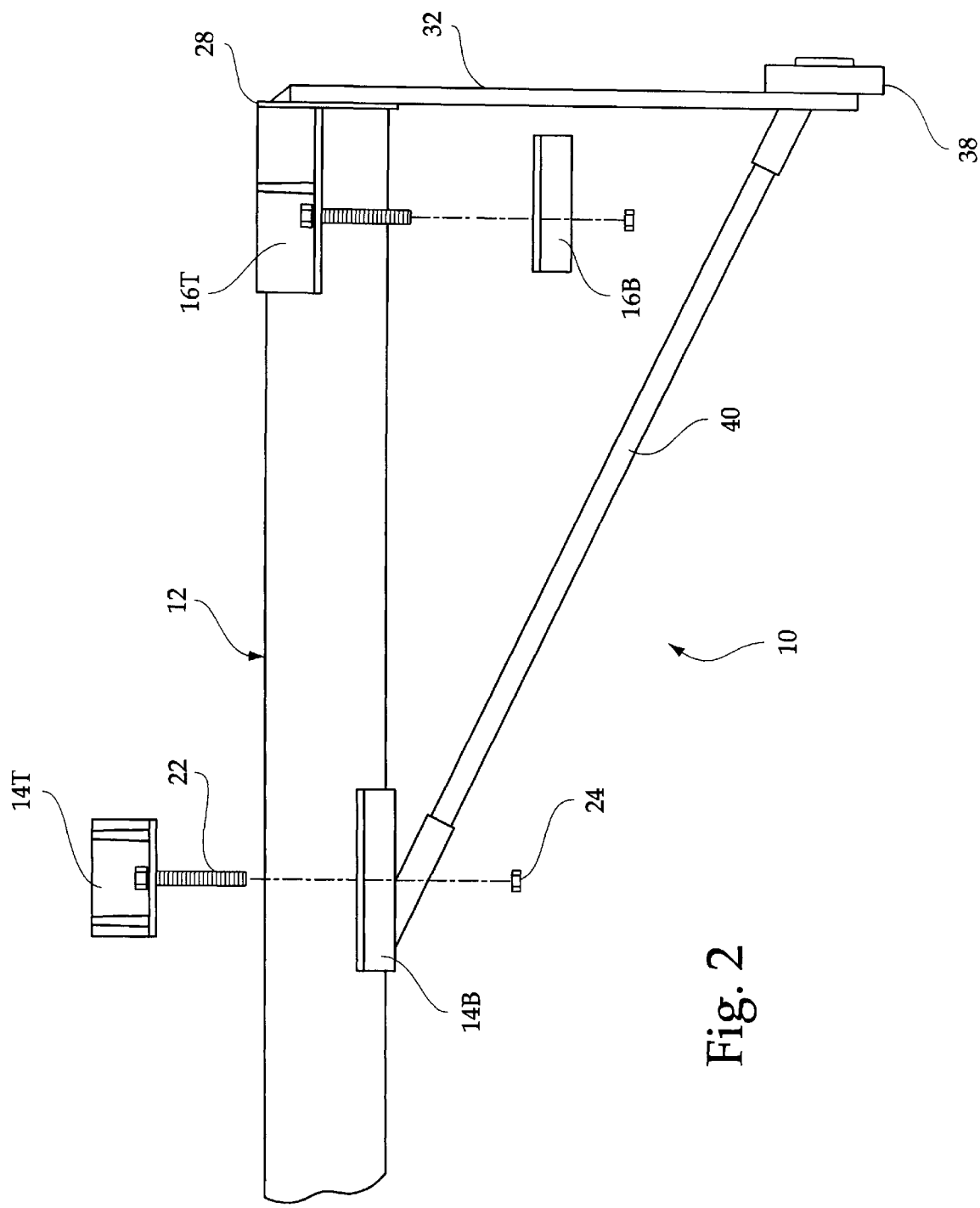
FIG. 2 is a side elevational view of the safety attachment for utility pole transport, unsecured to a utility pole.

The safety attachment for utility pole transport 10 comprises a plurality of horizontal support members and a pair of diagonal arms. The attachment 10 has a mid bracket 14 and an end bracket 16, both positioned along the proximal portion 12P of the pole 12. The mid bracket 14 is situated several feet from the rear end 12R of the pole 12, and has an upper brace 14T, extending around the top surface 12T of the pole 12, and a bottom brace 14B, extending around the underside 12U of the pole 12. Both braces 14T, 14B have flanges 18 that extend horizontally from the edges of the braces 14T, 14B and facilitate attachment of the braces to each other to secure the bracket 14 onto the pole 12. A bore 20 extends through the center of each flange 18. A fastening device 22, preferably a bolt, is inserted through the bore 20 of the top brace 14T and extends downward through the bore 20 in the bottom brace 14B, as illustrated in FIG. 2. A nut 24 secures the fastening device in place and serves to tighten the bracket 14 upon the pole 12.

The end bracket 16 is positioned at the rear end 12R of the pole 12. The construction of this bracket 16 is substantially similar to that of the mid bracket 14, having a top brace 16T and a bottom brace 16B. A fastening device 22 is also employed to hold the bracket 16 together around the pole 12. Further, an end plate 28 is connected to the top brace 16T, and extends vertically therefrom, as illustrated in FIG. 2. This plate 28 has a circumference slightly larger than that of the pole 12, thereby enabling said plate 28 to completely cover the rear end 12R of the pole 12.

A horizontal impact beam 38 is positioned below the pole end plate 28, and therefor in use is positioned directly below the pole rear end 12R. The end plate 28 has a common point 36, wherein a plurality of vertical support members 30, 32, 34, preferably three, are attached to the end plate 28, extending downward from said common point 36 to the impact beam 38. Of the vertical support members, a center member 30 extends straight down, perpendicular to the pole 12, while a left member 32 and a right member 34 are angled away from the center member 30. The angles are approximately 45 degrees, thereby allowing for a greater degree of support between the members.

A pair of diagonal arms 40, 42 are connected to and extend downward from the bottom brace 14B of the mid bracket 14, terminating at opposite ends of the impact beam 38. These diagonal arms 40, 42 may be detached from the safety attachment 10 in order to allow for storage and transport of said attachment 10. Reflectors or lighting devices 44 are positioned along the length of the horizontal impact beam 38 in order to aid in the prevention of a collision with the utility pole 12.

When the safety attachment for utility pole transport 10 is in place on a utility pole 12, the damage and injury caused in the event of an accident with another vehicle 50 is minimized. As illustrated in FIG. 3, upon collision with a vehicle 50, a front bumper 52 of the vehicle 50 would come into contact with the horizontal impact beam 38. Without the attachment 10 in place, the vehicle 50 would typically drive under the portion of the pole 10 extending outward from a transporting truck. The rear end 12R of the pole 10 would then collide with the vehicle windshield and penetrate the passenger compartment. In this event, the driver and occupants of the vehicle 50 would likely sustain great injury. Consequently, the safety attachment 10 prevents this scenario.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within.the scope of the invention.

What is claimed is:

1. A safety attachment for utility pole transport, the utility pole having an underside, a top surface, a rear end, and a standard circumference, said attachment comprising:

an end bracket positionable at the rear end of the pole;

an end plate connected to the end bracket, said end plate extending vertically downward from the bracket;

a horizontal impact beam positioned below the pole end plate at least one vertical support member, said support member extending between the end plate and the horizontal impact beam and connecting said beam to the end plate;

a mid bracket positionable along the pole away from the pole rear end, said mid bracket comprising an upper brace and a bottom brace, the upper brace for extending around the upper surface of the pole, and the bottom brace for extending around the underside of the pole; and at least one diagonal arm extending from the bottom brace of the mid bracket to the horizontal impact beam.

2. The safety attachment for utility pole transport as recited in claim 1, wherein the upper brace and the bottom brace of the mid bracket both have flanges extending horizontally from the braces' edges, each flange having a bore extending through the center thereof with a fastening device inserted through the bore of the upper brace and extending downward into the bore of the bottom brace, said fastening device used to attach the braces together about the pole.

3. The safety attachment for utility pole transport as recited in claim 1, having three support members, wherein the support members originate from a common point on the end plate, including a center support member extending downward from the common point perpendicular to the pole, and wherein at least two of the support members extend downward from the common point and angled away from the center member.

4. The safety attachment for utility pole transport as recited in claim 3, wherein the end bracket further comprises an upper brace and a bottom brace, the upper brace for extending around the upper surface of the pole, and the bottom brace for extending around the underside of the pole.

5. The safety attachment for utility pole transport as recited in claim 4, wherein the upper brace and the bottom brace of the end bracket both have flanges extending horizontally from said braces, each flange having a bore extending through the center thereof with a fastening device inserted through the bore of the upper brace and extending downward into the bore of the bottom brace, said fastening device used to attach the braces together about the pole.

6. The safety attachment for utility pole transport as recited in claim 5, wherein the end plate extends vertically downward from the upper brace of the end bracket, the circumference of the end plate being slightly larger than the pole's circumference.

7. The safety attachment for utility pole transport as recited in claim 1, wherein the horizontal impact beam has reflectors positioned along its length.

* * * * *